(12) United States Patent
Hazlehurst et al.

(10) Patent No.: US 7,574,933 B2
(45) Date of Patent: Aug. 18, 2009

(54) INDEXING DEVICE FOR MANUFACTURING SYSTEM FOR AIRCRAFT STRUCTURES AND OTHER LARGE STRUCTURES

(75) Inventors: Laurance N. Hazlehurst, Seattle, WA (US); Bobby C. Philpott, Jr., Kent, WA (US); James N. Buttrick, Seattle, WA (US); Darrell D. Jones, Mill Creek, WA (US); Kostadinos D. Papanikolaou, Southfield, MI (US); David P. Banks, Lake Stevens, WA (US); Terrence J. Rowe, Seattle, WA (US); Ronald Outous, Shoreline, WA (US); Charles H. Glaisyer, Everett, WA (US); Harry E. Townsend, Seattle, WA (US); Mark Boberg, Bellevue, WA (US); Paul Elfes Nelson, University Place, WA (US); John R. Porter, Lynnwood, WA (US)

(73) Assignee: The Boeing Company, Seattle, WA (US)

( * ) Notice: Subject to any disclaimer, the term of this patent is extended or adjusted under 35 U.S.C. 154(b) by 496 days.

(21) Appl. No.: 11/227,941

(22) Filed: Sep. 15, 2005

(65) Prior Publication Data
US 2006/0176156 A1    Aug. 10, 2006

Related U.S. Application Data

(63) Continuation of application No. 11/026,242, filed on Dec. 30, 2004, now Pat. No. 6,979,288, which is a continuation of application No. 10/004,060, filed on Oct. 31, 2001, now Pat. No. 6,855,099.

(51) Int. Cl.
  *G01M 19/00*  (2006.01)
(52) U.S. Cl. .................................. 73/865.8; 29/407.09
(58) Field of Classification Search ................. 73/865.8
  See application file for complete search history.

(56) References Cited

U.S. PATENT DOCUMENTS

| | | |
|---|---|---|
| 2,921,492 A | 1/1960 | Worth |
| 3,633,011 A | 1/1972 | Bederman et al. |
| 3,722,497 A | 3/1973 | Hiestand et al. |

(Continued)

OTHER PUBLICATIONS

Written Opinion for PCT/US02/34506 dated May 11, 2005.

(Continued)

*Primary Examiner*—Hezron Williams
*Assistant Examiner*—Nashmiya S Fayyaz
(74) *Attorney, Agent, or Firm*—Alston & Bird LLP

(57) ABSTRACT

A production system for manufacturing a workpiece comprises an index system including a plurality of index devices removably mounted on the workpiece at known longitudinally spaced locations therealong, and a longitudinally extending index member releasably engaged with at least two of the index devices such that a position and orientation of the index member are fixed relative to the workpiece by the index devices, the index member having position-indicating features distributed therealong. The production system further comprises a machine module mounted for longitudinal movement along the index member and operable to perform an operation, the machine module being operable to detect the position-indicating features on the index member and thereby determine a position of the machine module relative to the workpiece.

15 Claims, 14 Drawing Sheets

U.S. PATENT DOCUMENTS

| | | |
|---|---|---|
| 3,722,711 A | 3/1973 | Seidel |
| 3,994,060 A | 11/1976 | Van der Lely et al. |
| 4,422,384 A | 12/1983 | Johnson et al. |
| 4,486,128 A | 12/1984 | Baker et al. |
| 4,599,018 A | 7/1986 | Woods |
| 4,821,198 A | 4/1989 | Takeuchi et al. |
| 4,850,763 A | 7/1989 | Jack et al. |
| 4,928,383 A | 5/1990 | Kaczmarek et al. |
| 4,937,768 A | 6/1990 | Carver et al. |
| 5,016,359 A | 5/1991 | Nagaoka et al. |
| 5,168,638 A * | 12/1992 | Barton ................ 33/644 |
| 5,313,193 A * | 5/1994 | Dubois et al. ............ 340/572.1 |
| 5,477,596 A | 12/1995 | Schlosstein et al. |
| 5,588,554 A | 12/1996 | Jones |
| 5,635,833 A | 6/1997 | Onodera et al. |
| 5,718,545 A | 2/1998 | Husted |
| 5,836,068 A | 11/1998 | Bullen et al. |
| 5,910,894 A | 6/1999 | Pryor |
| 5,911,329 A * | 6/1999 | Wark et al. ............ 211/41.17 |
| 5,920,974 A | 7/1999 | Bullen |
| 6,000,192 A | 12/1999 | Cohen et al. |
| 6,095,728 A | 8/2000 | Howie |
| 6,098,260 A | 8/2000 | Sarh |
| 6,158,666 A | 12/2000 | Banks et al. |
| 6,317,954 B1 | 11/2001 | Cunningham et al. |
| 6,357,101 B1 | 3/2002 | Sarh et al. |
| 6,480,271 B1 | 11/2002 | Cloud et al. |
| 6,808,143 B2 * | 10/2004 | Munk et al. ............... 244/123.1 |
| 7,036,729 B2 * | 5/2006 | Chung ................ 235/385 |
| 7,360,700 B2 * | 4/2008 | Parks ................ 235/384 |
| 2003/0116331 A1 | 6/2003 | Boyl-Davis et al. |
| 2005/0132560 A1 * | 6/2005 | Jones et al. ............ 29/559 |
| 2005/0251985 A1 * | 11/2005 | Arntson et al. ............ 29/407.05 |

OTHER PUBLICATIONS

Dennis R. Mathis, Dana Jackson, Video Aid to Assembly System, A Method of Displaying Assembly Drawings for Long Assemblies and Moving Assembly Lines, Jan. 20, 2000.

Holger Maylander, Ed Bella, Brotje-Integrated Panel Assembly CELL (IPAC) for High Speed Riveting applications in Commercial Airplane Production, 1999, of Automotive Engineers, Inc.

Daryl Stephenson, Read my winds, Ink-jet printers put blueprint into onto F/A-18 assemblies, Jun. 29, 1999, Boeing News.

* cited by examiner

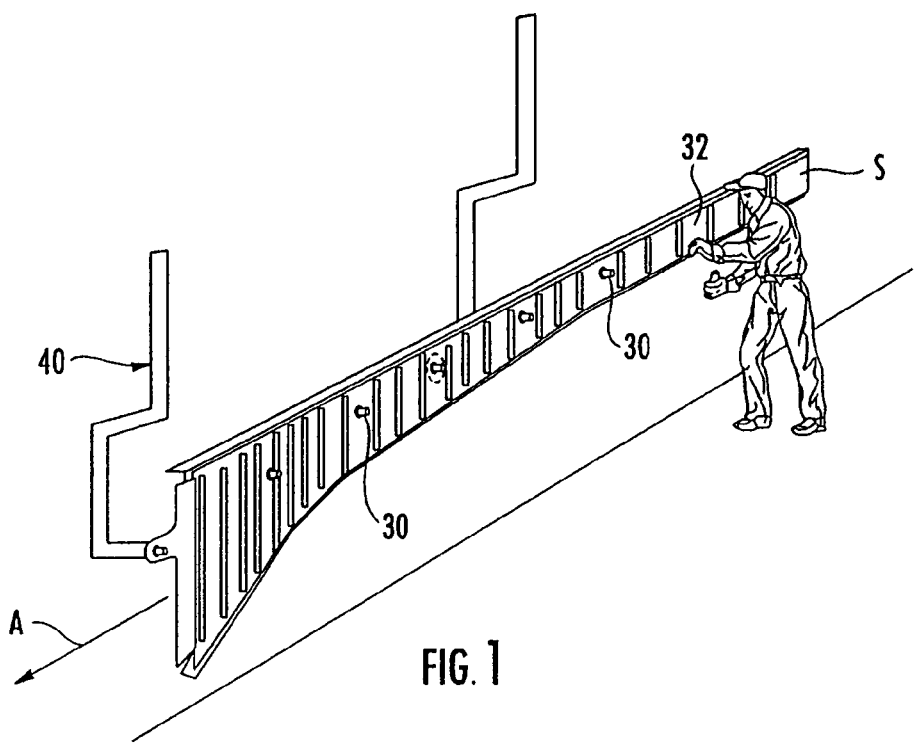
FIG. 1
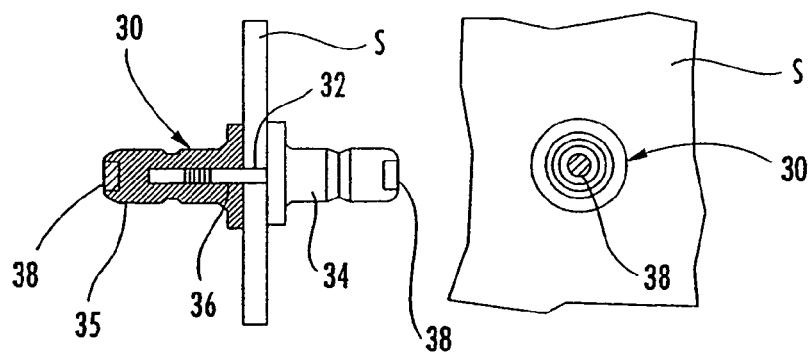
FIG. 2
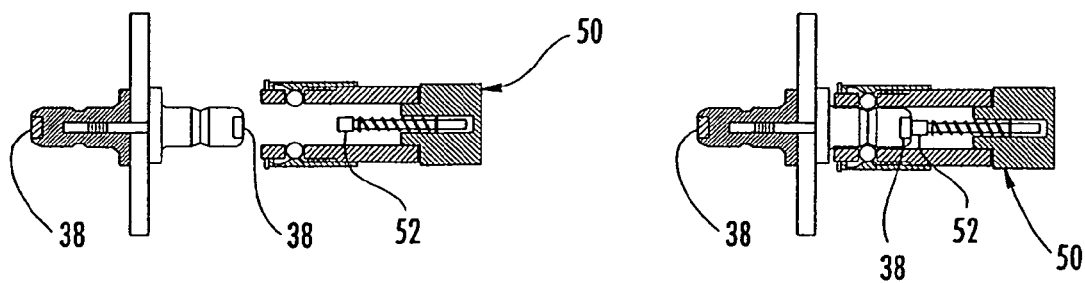
FIG. 3A.
FIG. 3B.

INDEXING DEVICE FOR MANUFACTURING SYSTEM FOR AIRCRAFT STRUCTURES AND OTHER LARGE STRUCTURES

CROSS-REFERENCE TO RELATED APPLICATIONS

This application is a continuation of U.S. application Ser. No. 11/026,242, filed Dec. 30, 2004 now U.S. Pat. No. 6,979,288, which is a continuation of U.S. application Ser. No. 10/004,060, filed Oct. 31, 2001, now U.S. Pat. No. 6,855,099, which is hereby incorporated herein in its entirety by reference.

FIELD OF THE INVENTION

The present invention relates to a production system for manufacturing large structures such as aircraft spars, planks, wing sections, fuselage sections, and the like, and other large structures. The invention relates more particularly to a production system of non-fixed-base type employing either a continuous-flow or pulse-flow process and using machine modules that are brought into engagement with the workpiece as the workpiece travels along its process flow path and that index to the workpiece with the aid of index devices mounted on the workpiece.

BACKGROUND OF THE INVENTION

Large structures such as those mentioned above are traditionally manufactured using large fixed-based machines such as robotic drilling machines and riveting machines. Some of the well-known drawbacks of using such machines include the high initial capital investment to acquire and install the equipment and the large and expensive foundations that they require, the significant amount of time and resources required for training workers how to operate the complex machines and for maintaining and supporting the machines, and the loss of productive use of the machines during certification, qualification, and maintenance of the machines. Additionally, large fixed-based machines do not lend themselves to Continuous Flow Manufacturing (CFM), which is considered by most leading manufacturing experts to be the most efficient manufacturing method. Furthermore, manufacturing of large structures such as airplane structures has conventionally required model-specific tooling such as floor assembly jigs (FAJs) and Gemcor header systems. Such model-specific tooling represents a substantial fraction (e.g., about one-third) of the total cost of developing a new airplane.

Because of disadvantages such as those mentioned above, alternative manufacturing methods that avoid one or more of these disadvantages are desirable. Preferably, the methods should be capable of supporting a CFM process, and should facilitate off-line maintenance and qualification of a machine while another replacement machine continues production, and hence a system employing non-fixed-base machines is needed. Although these goals are desirable, they have been difficult to achieve for various reasons, not the least of which is the difficulty of accurately positioning non-fixed-base machines relative to the workpiece. Systems such as laser positioners can be used for positioning machines relative to the workpiece, but such systems are highly complex and usually require set-ups that are specific to the particular workpiece being manufactured, and are often limited by line-of-sight considerations.

SUMMARY OF THE INVENTION

The present invention addresses the above needs and achieves other advantages by providing a production system employing non-fixed-base machines that interface with a workpiece via an index system that can travel along with the workpiece in a CFM or pulse-flow manufacturing process, the index system accurately locating the machine relative to the workpiece by physically indexing to index devices removably mounted on the workpiece. In accordance with one aspect of the invention, a production system for manufacturing a workpiece comprises an index system including a plurality of index devices removably mounted on the workpiece at known longitudinally spaced locations therealong, and a longitudinally extending index member releasably engaged with at least two of the index devices such that a position and orientation of the index member are fixed relative to the workpiece by the index devices, the index member having position-indicating features distributed therealong. The production system further comprises a machine module mounted for longitudinal movement along the index member and operable to perform an operation, the machine module being operable to detect the position-indicating features on the index member and thereby determine a position of the machine module relative to the workpiece.

The index member can be an elongate, precision-manufactured beam or bar. The position-indicating features along the index member can be provided in various ways, including but not limited to a machine-readable tape or strip affixed along the index member. The strip can be optically or magnetically encoded with position-indicating information. The machine module in this case includes a reader operable to read the encoded strip and thereby determine a position of the machine module relative to the workpiece.

The index member is located and oriented in a known manner relative to the workpiece by engaging the index devices mounted on the workpiece. The index devices in preferred embodiments of the invention comprise pins or the like that are removably mounted in holes formed through the workpiece in known locations. Preferably, each index device has a sensor mounted thereon or embedded therein, the sensor storing in machine-readable form an identifier that is unique to that index device. Thus, the various index devices mounted on the workpiece all have different identifiers, and these identifiers can be correlated with different zones of the workpiece that have different process requirements. For instance, a controller of the production system can store process information for each zone of the workpiece, correlated with the identifier for that zone, and the index system can include a reader that interacts with the index device proximate that zone and reads the identifier stored in the sensor. The controller can then receive the identifier from the reader and retrieve the process information for the particular workpiece zone. The process information may include, for example, locations and diameters of holes to be drilled in the workpiece, locations of additional parts to be clamped and fastened to the workpiece, markings to be applied to the workpiece and the locations of such markings, and/or other information.

The index devices preferably comprise index pins that are installed in holes drilled through the workpiece in predetermined locations. The index pin preferably comprises two releasably engageable portions that extend from opposite sides of the workpiece when installed in a hole therein. Either or both portions of the index pin can have a sensor installed therein. For instance, when both sides of the workpiece must be processed, it is advantageous to use index pins that have sensors in both portions thereof; the two sensors can thereby convey separate information to machine modules positioned adjacent each side of the workpiece.

The machine module engaged with the index member can be of various types, including a drilling device with or without an associated clamping mechanism and with or without an automatic drill changing device for changing a drilling tool of the drilling device, a marking device for applying markings on the workpiece, a fastener insertion device for inserting fasteners such as bolts or rivets into holes formed through the workpiece, a device for probing the workpiece, and/or other devices.

In some embodiments of the invention, the machine module or a frame thereof has a drive device that drivingly engages the index member for moving the machine module along the index member. As a non-limiting example, the index member can have a gear element such as a precision rack and the machine module can have a drive gear arrangement such as a pinion gear drive that drivingly engages the gear element of the index member and is driven by a suitable drive motor such as a stepper motor with encoder or the like. Alternatively, the machine module can be driven off a floor along which it travels.

As mentioned above, the machine module can include a clamping arrangement for clamping together parts of the workpiece to be joined. In such cases, the clamping arrangement can comprise a frame having opposed, relatively movable clamping members that clamp the parts therebetween. For instance, the clamping arrangement can comprise an O-frame on one leg of which is mounted a drive device for drivingly engaging the index member to drive the machine module therealong. The clamping arrangement can be mounted on a base that is supported on a floor of a building in which the production system is housed, and the base can have a resilient suspension such that the base is supported in a vertically floating manner on the floor. Accordingly, once the clamping arrangement clamps the workpiece, it can be carried along with the workpiece as the workpiece travels along its process flow path, such as in a CFM process.

In one preferred embodiment, the O-frame can include a portion that is movable between a closed position and an open position. In the closed position of the movable frame portion, the movable frame portion and the rest of the frame surround the workpiece. In the open position of the movable frame portion, an opening in the frame is defined through which the workpiece can pass. Thus, the frame can be disengaged or engaged with the workpiece at any position therealong, in contrast to prior O-frame machines that must be moved to one or the other end of the workpiece to engage or disengage the workpiece. The movable portion of the frame can comprise a drop tower that is movable between a generally vertical position and a generally horizontal position.

In accordance with another aspect of the invention, the index system includes an index support system for supporting the index member, the index support system being operable to allow relative movement between the index member and workpiece prior to engaging the index devices installed in the workpiece, the index support system being operable to lock up after the index system engages the index devices so as to immobilize the index member relative to the workpiece. The production system can also include a material handling system operable to hold the workpiece and transport the workpiece along a process flow path. In some embodiments, the index support system is supported on or by the material handling system. The index support system can include a pair of clamp assemblies operable to applying clamping forces to the workpiece from opposite sides thereof.

In other embodiments, the index support system includes at least one zero-balance support device for supporting the index member and the machine module on a floor such that prior to lock-up of the index support system the index member and machine module are vertically movable upward and downward by application of forces substantially less than the weight of the index member and machine module. The index support system after lock-up thereof can be pulled by the material handling system so as to travel along the process flow path with the workpiece.

In still another aspect of the invention, the index member engages a first index device and the machine module engages a second index device longitudinally spaced from the first index device, and the production system further comprises a controller in communication with the machine module. The machine module sends a signal indicative of the longitudinal position of the machine module to the controller, and the controller is operable to determine a longitudinal growth of the workpiece between the first and second index devices based on the signal from the machine module when the machine module is engaged with the second index device. Cumulative growth can be measured by sequentially measuring growth between successive pairs of index devices. The growth of the workpiece can be caused by prior work operations performed on the workpiece as a result of thermal elongation or other factors. Preferably, the production system takes into account the measured growth of the workpiece during the manufacturing process.

Also encompassed within the scope of the invention is a production system employing a riveter for installing rivets through holes in the workpiece and upsetting the rivets. The riveter can comprise a hydraulic, pneumatic, or electromagnetic riveter. Preferably, the riveter is a hydraulic rivet press that works by application of steady pressure rather than by hammering the rivets as is conventionally done. The hydraulic rivet press is much quieter than conventional riveters. In a preferred embodiment of the invention, the riveter is supplied with rivet wire that is cut to the proper length in a rivet wire cutting device. The cutting device is controlled by a controller that is in communication with a clamping device that clamps together parts of the workpiece to be riveted together. The clamping device is operable to measure a stack-up thickness of the parts to be joined, and the controller controls the cutting device to cut the rivet wire to the proper length based on the measured stack-up thickness. The cut rivet wire is then supplied to the riveter. The production system can include two or more cutting devices supplied with rivet wires of different diameters, the controller selecting the appropriate cutting device depending on the rivet size required for a particular hole location on the workpiece.

In accordance with a further aspect of the invention, process information for various zones of the workpiece can be stored for access by a controller in communication with a reader that engages an index device mounted proximate a zone of the workpiece. The reader can read a unique identifier stored in a sensor of the index device and the controller can access a set of process information corresponding to the identifier. The production system includes a device for converting the process information to a visual form for use of workers. For instance, the device can be a marking device that applies markings onto the workpiece for subsequent use by workers, a projector that projects indicia and/or graphics onto the workpiece, or a monitor such as a CRT device or the like. In this manner, manufacturing plans pertaining to a given workpiece can be quickly and easily made available to workers even when multiple configurations of workpieces are manufactured on the same production line.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 1 is perspective view of a spar supported by a material handling system and being fitted with index devices in accordance with the invention;

FIG. 2 is a cross-sectional view showing a representative index device installed in a hole in a workpiece;

FIG. 3A is a cross-sectional view showing a reader associated with the index member prior to engagement of the reader with the index device;

FIG. 3B is a view similar to FIG. 4A, showing engagement of the reader with the index device;

DETAILED DESCRIPTION OF THE INVENTION

Figure 4:
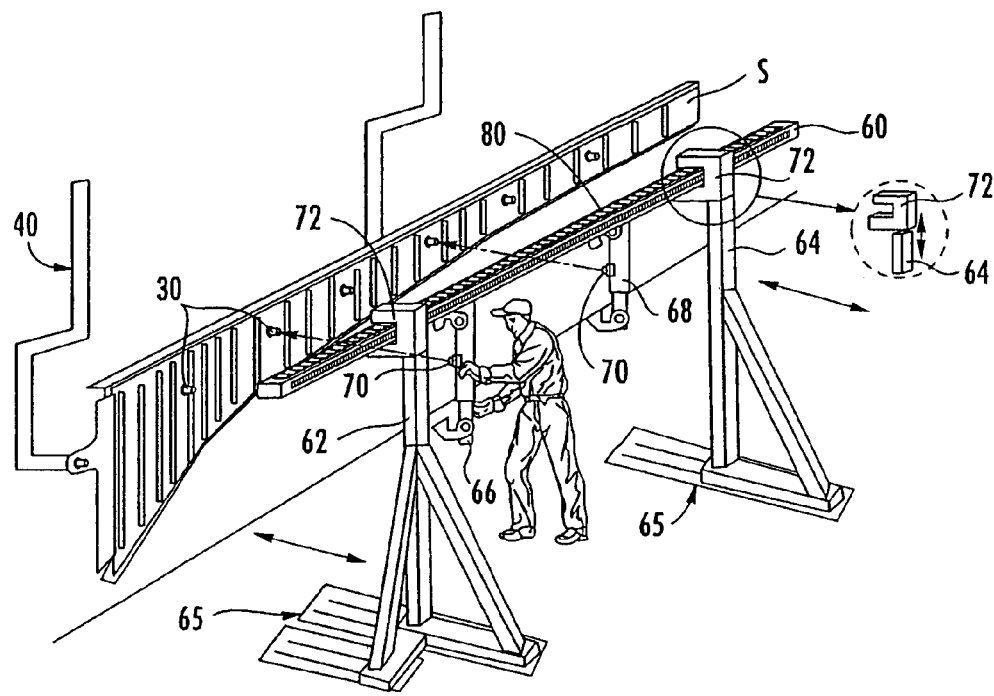
FIG. 4 is a perspective view of the spar fitted with index devices, showing an index bar supported by an index support system being moved into engagement with a pair of the index devices.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIG. 1, a spar S is shown being fitted with index devices 30 in accordance with some embodiments of the present invention. The spar S is supported by a material handling system 40 that transports the spar along a process flow path as indicated by the arrow A. The production system can employ either a continuous-flow manufacturing process wherein the spar S continually moves along the process flow path, or a pulse-flow manufacturing process wherein the spar is alternately halted for work processes to be performed and then moved or "pulsed" farther down the process flow path to another location at which the spar is again stopped for the performance of further work processes. In accordance with the invention, the spar S is initially prepared for installation of the index devices 30 by pre-drilling a series of holes 32 in the spar at known locations thereof. Any suitable accurate drilling machine can be used for drilling the holes 32; correct placement of the holes 32 is important because all indexing of subsequent manufacturing operations will be performed by reference to the index devices 30 installed in the holes 32.

FIG. 2 shows an index device 30 installed in a hole 32 in the spar S. In the illustrated preferred embodiment, the index device 30 comprises a quick-disconnect pin having a front portion 34 that engages a front side of the spar and a rear portion 35 that engages the opposite rear side of the spar. The front portion 34 includes a shaft 36 that fits with a tight slip fit through the hole 32 in the spar and is received in a bore in the rear portion 35. The distal end of the shaft 36 is threaded, as is the bore in the rear portion of the index device. Thus, the rear portion 35 is rotated relative to the front portion 34 to draw the front and rear portions toward each other and clamp firmly onto the spar. Of course, it will be understood that the illustrated pin is only one example of many possible configurations of pins or similar structures that can be used.

A sensor 38 is mounted or embedded in the front portion 34 of each index device, and another sensor 38 is mounted or embedded in the rear portion 35 of the index device. Alternatively, only one of the front and rear portions 34, 35 can have the sensor 38 while the other has no sensor; this arrangement would be used if the workpiece is to be processed from only one side thereof. However, the illustrated index device having sensors 38 in both front and rear portions is advantageous when the workpiece is to be processed from both sides thereof. The front portions 34 of the various index devices 30 have a uniform exterior configuration from one to another so that each can be engaged by the same index member or arm, as described below; likewise, the rear portions 35 have a uniform exterior configuration, which advantageously is the same as the front portions. Either or both of the front and rear portions has an exterior configuration that defines datum surfaces providing position references to a device that engages the index device. Preferably, each housing portion defines at least X and Y datum surfaces, X and Y being coordinates generally in the plane of the workpiece surface S. Still more preferably, the index device also defines a Z datum surface providing a position reference in the Z direction (generally normal to the workpiece surface S). When a device engages the index device, therefore, the position of the device is determined in X, Y, and Z.

The sensor 38 of each index device has a unique identifier stored therein. The sensor 38 is machine-readable such that a suitable machine reader can read the identifier stored in the sensor. Preferably, the sensor 38 comprises a "smart button" or similar type of sensor having an internal microchip (not shown) that is programmed with the unique identifier. As shown in FIGS. 3A and 3B, a reader 50 is configured to fit over the index device 30 such that a contact 52 in the reader makes contact with the sensor 38. The electrical microvoltage potential between the contact 52 and the sensor 38 provides the power source for reading the identifier stored in the sensor 38. Accordingly, any given hole 32 in the spar S can be identified by the reader 50 based on the unique identifier of the index device 30 installed in the hole. The purposes to which this ability to identify holes 32 are explained below. As an alternative to a smart button that is physically engaged by a reader, the index device 30 can instead employ a sensor that is remotely read by a suitable reader. For instance, the sensor can transmit radio-frequency signals that are received by the reader; other sensor and reader systems that work in yet other ways can also be used. Thus, the details of the sensor and reader system are not of particular importance to the present invention. The important consideration is that information about a workpiece zone can be conveyed to a machine module or controller by a sensor installed in an index device mounted proximate the workpiece zone.

Figure 5:
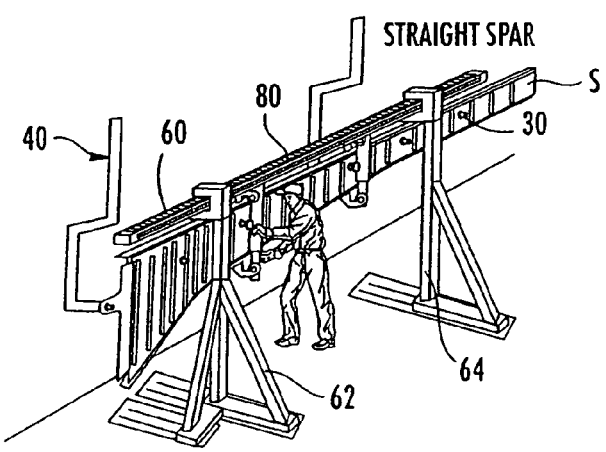
FIG. 5 is a perspective view of the production system of FIG. 3, after the index member is engaged with the index devices, and illustrating a straight spar.

The various index devices 30 preferably are made visually identifiable, such as by color-coding them or marking them with suitable indicia and/or graphics, so that workers can readily identify which index device 30 is to be installed in any given hole 32 in the spar. With reference to FIG. 4, once all of the index devices 30 have been installed in their proper holes, an index member 60 is moved into engagement with a pair of the index devices 30. The index member 60 is supported by an index support system comprising a pair of supports 62 and 64 that are movable toward and away from the spar S on floor slides 65 so that a worker can easily maneuver the index member 60 into position to engage the index devices 30. The supports 62, 64 also allow inboard and outboard movement of the index member 60 (i.e., movement in the longitudinal direction of the index member). The supports 62, 64 are initially flexible to allow the index member 60 to be maneuvered until a pair of index arms 66, 68 affixed to the index member securely engage the selected index devices 30, as shown in FIG. 5. The index arms 66, 68 include clamping devices 70 that securely clamp onto the index devices 30. The clamping device 70 can be an HSK type tool holder mechanism or can be as simple as a precision V-groove with a quick-release clamp for clamping the index device 30 in the V-groove. Once the index arms have clamped onto the index devices, the supports 62, 64 clamp or "lock up" on the index member 60 via clamping mechanisms 72, and the floor slides 65 are also locked in position. System lock-up can be effected by pneumatic, hydraulic, or electrical actuators. The index member 60 is thus locked into a fixed position and orientation relative to the workpiece, which position and orientation are dictated by the locations of the index devices 30 engaged by the index arms 66, 68. Since the locations of these index devices 30 are known, the position and orientation of the index member 60 relative to the workpiece are known.

The index member 60 includes position-indicating features distributed along its length. More particularly, in the illustrated embodiment, the index member includes a position-encoded tape or strip 80 extending lengthwise therealong. The strip 80 can be encoded optically or magnetically, or in any other way. The index member 60 can comprise a precision beam or bar that is straight to a high degree of accuracy and is formed of a suitably rigid material such as steel or composite material. The index member 60 is used for positioning other machine modules relative to the workpiece, by providing such machine modules with the capability of reading the position-encoded strip 80. The machine module can thereby determine its position along the index member 60.

Figure 7:
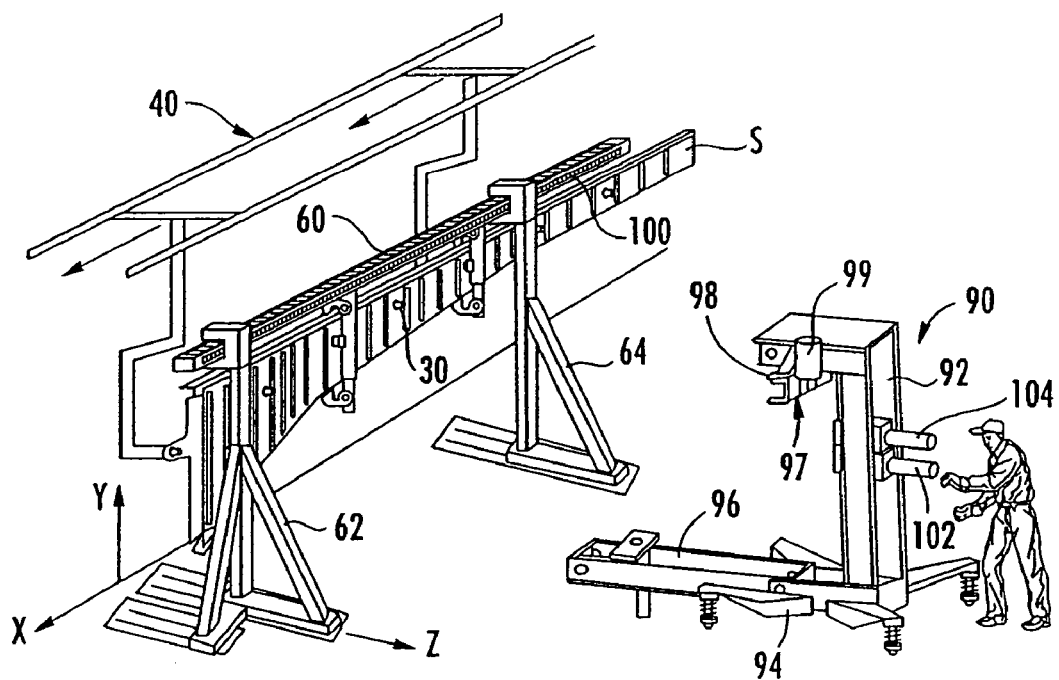
FIG. 7 is a perspective view similar to FIG. 5, showing an O-frame machine module in an open position in preparation for being moved into engagement with the index member and workpiece.
Figure 8:
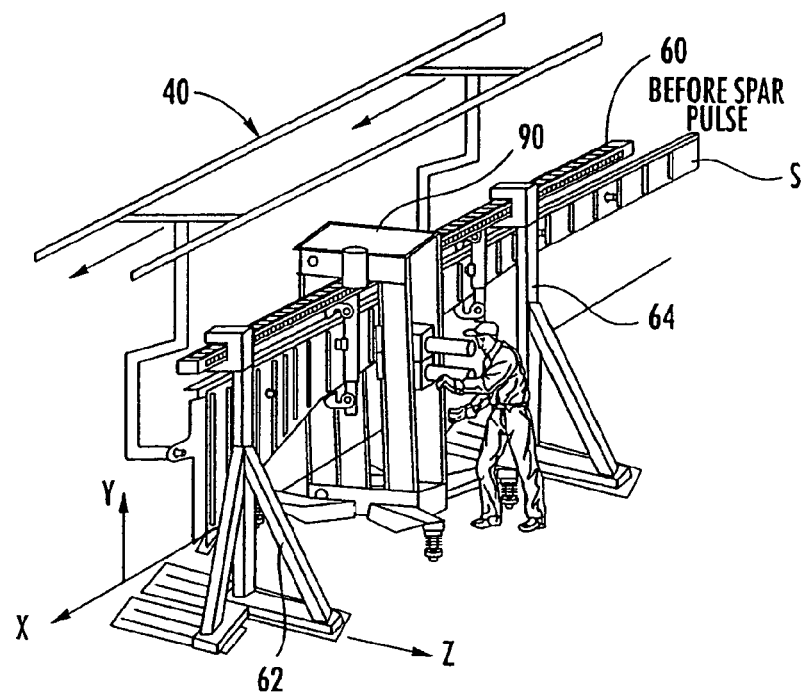
FIG. 8 shows the O-frame machine module engaged with the index member.
Figure 9:
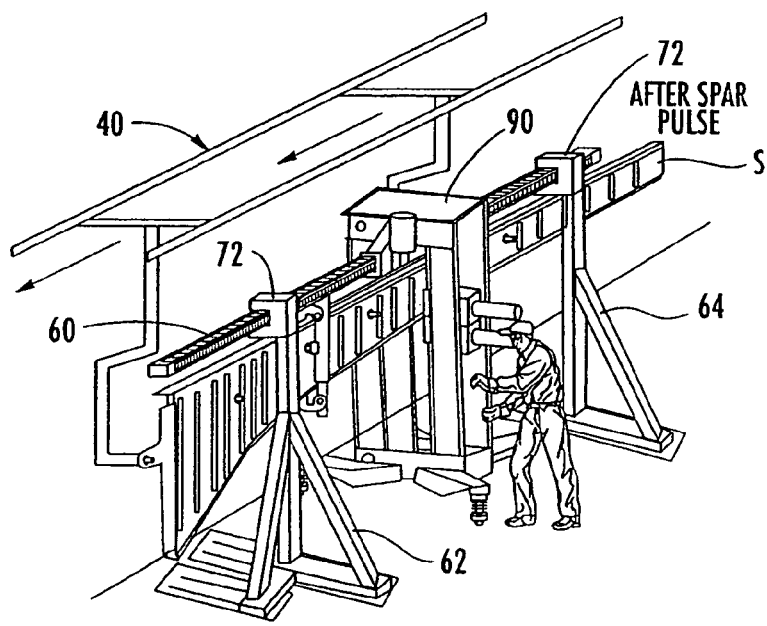
FIG. 9 shows the system of FIG. 8 after a movement of the spar has been made by the material handling system in a pulse-flow manufacturing process.

Thus, FIGS. 7 through 9 depict one embodiment of the invention having a machine module for engaging the index member 60, in the form of an O-frame machine 90 having a frame formed of a vertical L-shaped frame member 92 supported on a floor-engaging base 94, and a tower 96 pivotally connected to the frame member 92 at the lower end thereof. The tower 96 is movable between a generally vertical or closed position and a generally horizontal or open position. With the tower 96 in a open position as shown in FIG. 7, the O-frame machine 90 can be pushed up to the spar S so that the tower 96 passes beneath the spar, until an O-frame positioner 97 mounted on the upper horizontal cross member of the frame member 92 engages the index member 60. The O-frame positioner 97 preferably comprises a reader 98 for reading the encoded strip 80 on the index member 60, and a drive mechanism 99 for drivingly engaging the index member 60 so as to drive the O-frame machine 90 back and forth along the length of the index member. In a preferred embodiment, the index member 60 has a precision rack 100 mounted along the length of the index member, and the drive mechanism 99 on the O-frame comprises a pinion drive gear arrangement with a suitable drive motor such as a stepper motor or the like. Of course, other types of drive arrangements can be used for driving the O-frame machine along the index member, the rack and pinion arrangement being merely exemplary of one possible type of arrangement. Once the O-frame is positioned relative to the workpiece, the drop tower 96 is raised to its generally vertical closed position.

FIG. 8 shows the O-frame machine 90 after the tower 96 has been raised and locked into position engaging the opposite frame member. The base 94 of the O-frame machine preferably has a resilient or spring suspension so as to allow some degree of vertical movement of the O-frame machine relative to the floor. Accordingly, the index member 60 can be used as a guide rail for guiding the positioning of the O-frame machine in the X direction; the O-frame "floats" along the floor while being held fixed relative to the index member 60 in the Y direction. Within the range of motion possible between the index supports 62, 64, the O-frame machine 90 can be driven in one direction or the opposite direction (i.e., the X direction in FIG. 8) so as to position the machine in a proper location relative to the workpiece for performing a work operation on the workpiece. The O-frame machine 90 can, for example, support a drill 102 for drilling holes in the workpiece, and a hydraulic press or ram 104 for inserting fasteners (e.g., bolts or rivets) into the holes. The machine includes suitable positioners (not shown) for positioning the drill and hydraulic ram on the frame member 92 in the Y direction.

The system shown in FIGS. 7-9 comprises a pulse-flow system. FIG. 8 shows the system before a pulse or movement of the spar S along the X direction. When the spar is to be pulsed, the clamping mechanisms 72 of the index supports 62, 64 are unclamped from the index member 60 and the floor slides 65 are unlocked so that the index member 60 can move along the X direction, and the spar is then pulsed and brought to a stop at a new position along the X direction, as shown in FIG. 9. By pulsing the spar, a new zone of the spar is brought within the working envelope defined between the index supports 62, 64. Once the spar is brought to a halt at the new location, the clamping mechanisms 72 of the index supports are again clamped onto the index member 60 and the floor slides 65 are again locked so that the index member 60 and index supports 62, 64 will react any forces caused by positioning the O-frame machine.

Figure 6:
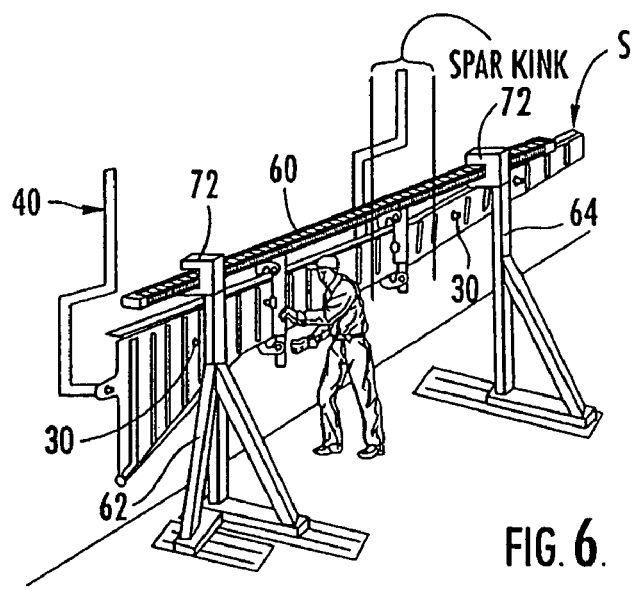
FIG. 6 is a perspective view similar to FIG. 5, illustrating a non-straight spar.

When a workpiece such as a spar is not linear, the system of the invention can still be used, but the index support system may require a slight modification. For example, FIG. 6 shows a production system similar to that of FIG. 5, except that the spar S is "kinked" such that it has one substantially straight portion that joins another substantially straight portion at an angle thereto. To accommodate such a kinked spar, the index support 64 (or both of the supports 62 and 64) has the capability of adjusting the vertical position of the clamping mechanism 72, as shown in the inset of FIG. 6. Accordingly, the index member 60 can be varied in angle of inclination so that it can be aligned along one straight portion of the spar by engaging two index devices 30 on one side of the kink such that work operations can be formed on that portion of the spar. Then, when work operations are to be performed on the other portion of the spar on the opposite side of the kink, the spar S can be pulsed to bring that portion of the spar into the working envelope between the supports 62, 64 and the angle of inclination of the index member 60 can be adjusted as needed to engage a pair of index devices 30 on that portion of the spar.

Figure 10:
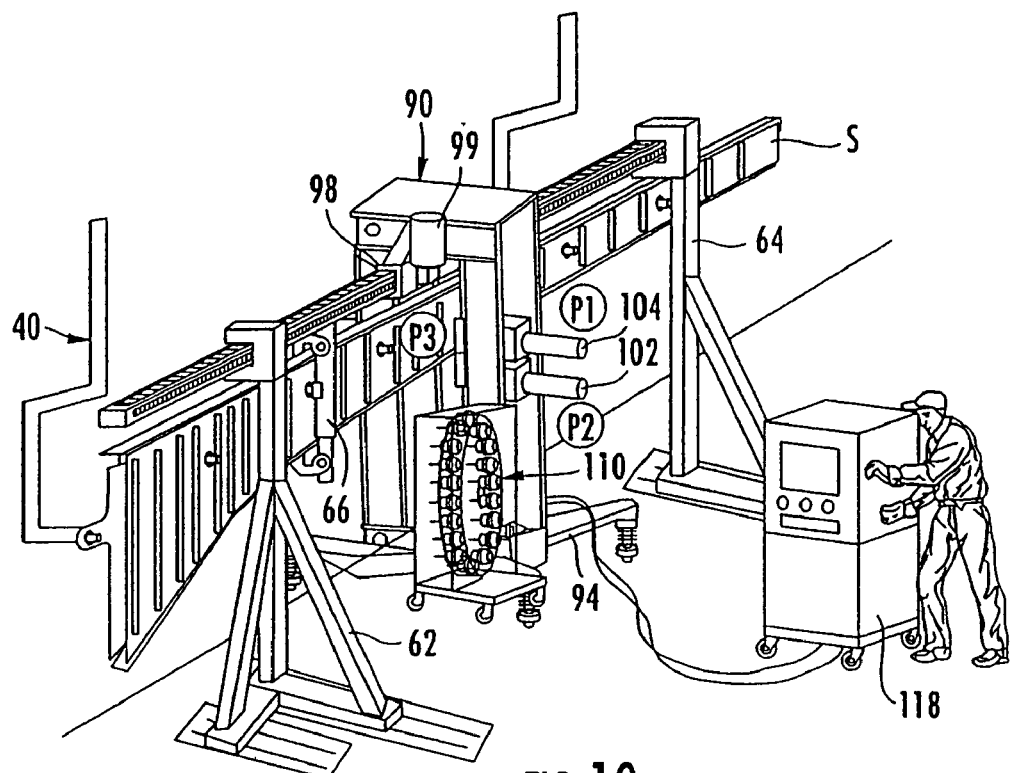
FIG. 10 shows a production system similar to that of FIG. 8, except that the O-frame machine module includes an automatic tool changing device.
Figure 12:
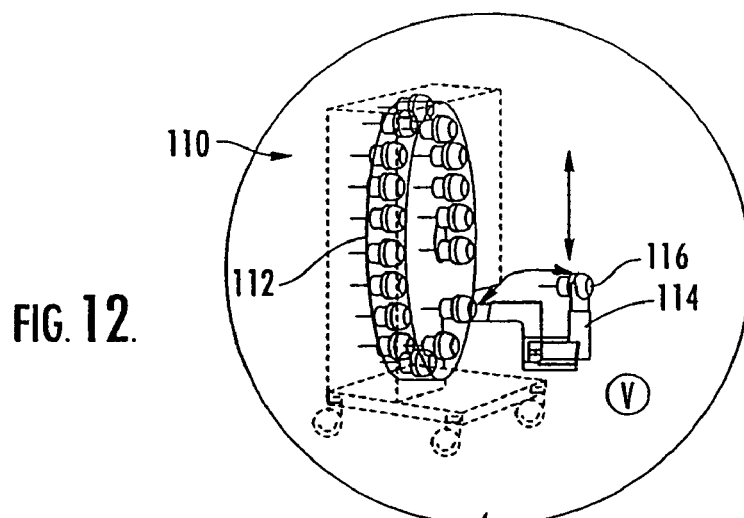
FIG. 12 shows the tool changing device in isolation.
Figure 11:
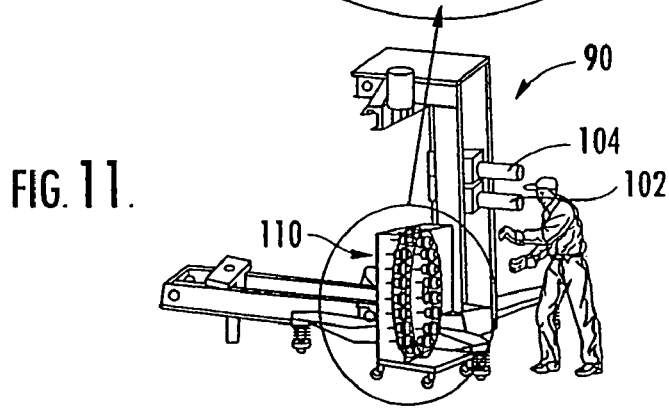
FIG. 11 shows the O-frame module with tool changing device in isolation.

FIG. 10 shows a production system similar to that of FIGS. 7-9, except that the O-frame machine 90 further includes an automated drill changer 110 mounted on the base 94 of the machine. FIGS. 11 and 12 show the O-frame machine with automated drill changer in greater detail. The drill changer 110 in this embodiment comprises a carousel 112 that interacts with a changing arm mechanism 114 to accept a drill tool 116 from the drill 102 and place the tool in the carousel 112, and then retrieve a new drill tool from the carousel and position it for receipt by the drill. Other types of tool changing mechanisms can be used, such as "wine rack" type arrangements or others. FIG. 10 also depicts a controller 118 for the production system connected to the machine 90. The controller 118 supplies hydraulic power to the machine 90 and also controls the functions of the machine with the aid of feedback signals sent from the various devices of the machine to the controller. For example, the controller is in communication with the encoder strip reader 98 of the machine and the drive arrangement 99 for controlling positioning of the machine in the X direction. The controller is also connected to the sensor readers (not shown in FIG. 10, but see reader 50 in FIGS. 3A and 3B) built into the index arms 66, 68 so that the controller receives the identifiers read by the readers and thus can determine the zone of the spar S at which the machine is currently positioned. Preferably, the controller 118 is connected to the machine and other components by quick-disconnect connectors so that the controller can be quickly replaced with another controller if necessary.

Additionally, the controller 118 can include a data storage component (not shown), or can be linked to such a storage component at a remote location, in which process information for all zones of the spar can be stored. Each set of process information for each zone of the workpiece is correlated with the identifier corresponding to the index device 30 located adjacent the zone. Accordingly, when the controller 118 receives the identifier from the reader in engagement with the index device 30 at a given workpiece zone, the controller retrieves the set of process information pertaining to that zone based on the identifier. This process information can then be used by the controller for controlling the machine 90 so that the machine performs work operations on the workpiece. For instance, the process information can include the locations and diameters of holes to be drilled in the workpiece, the locations and sizes of fasteners to be inserted in the holes, and other process information.

Figure 13:
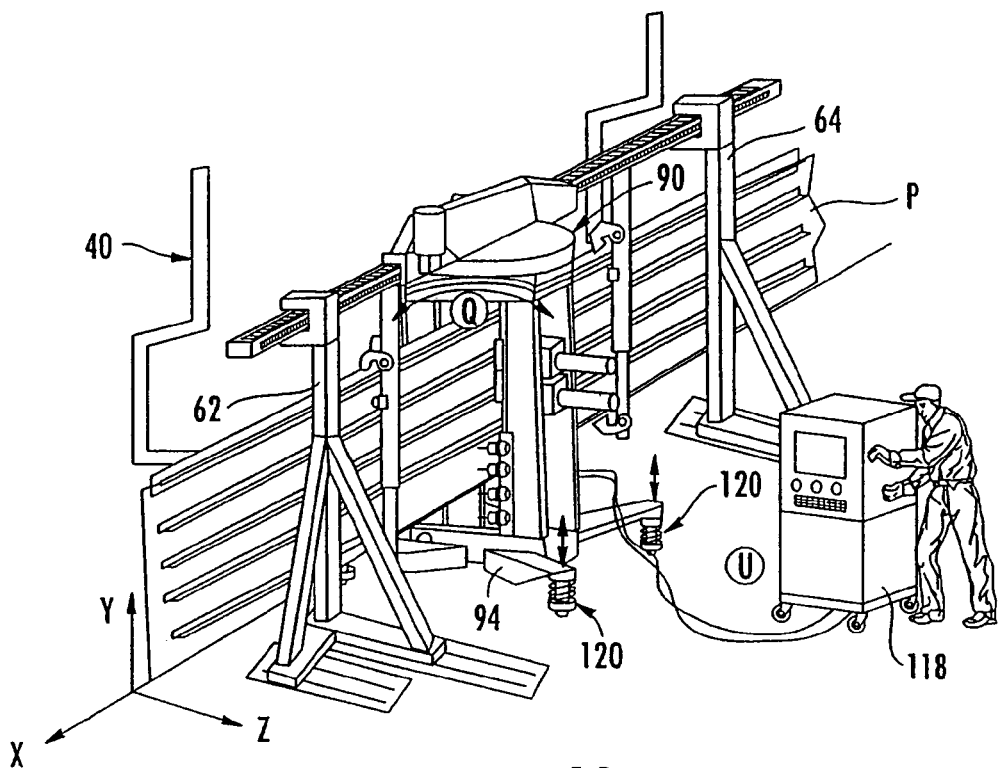
FIG. 13 shows a production system having a machine module comprising a drill and fastener insertion device arranged for rotation about two different rotation axes.

FIG. 13 shows a production system similar to those of FIGS. 7-10, except that the O-frame machine 90 has rotation capabilities and has a wine rack type drill changer 110. The machine 90 is rotatable about an axis parallel to the Y axis. Additionally, the machine is rotatable about an axis parallel to the X axis by providing lifting actuators 120, such as servo hydraulic cylinders or the like, on the base 94. Raising or lowering one side of the base relative to the opposite side thus causes rotation of the machine about the horizontal axis. The 2-axis rotational capability of the machine enables the machine to drill and fasten complex contoured planks P or the like, with the direction of drilling remaining substantially normal to the workpiece surface.

Figure 14A:
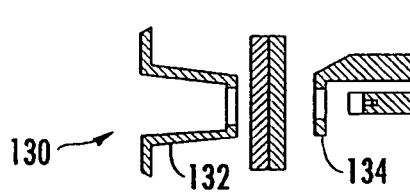
FIGS. 14A through 14I depict a sequence of operations of an automated rivet cutting system in accordance with the invention.
Figure 14B:
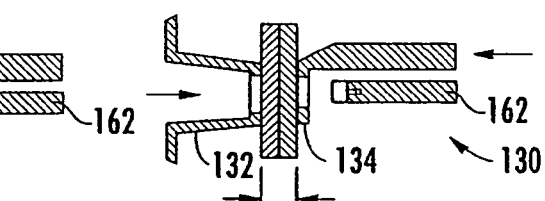
Figure 14C:
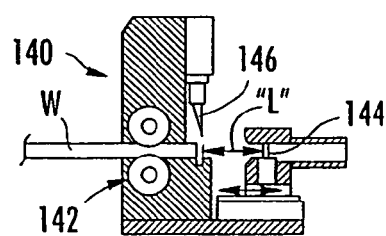
Figure 14D:
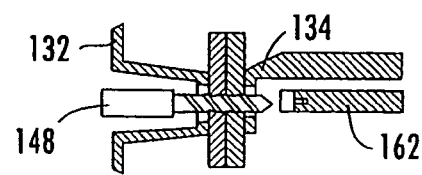
Figure 14E:
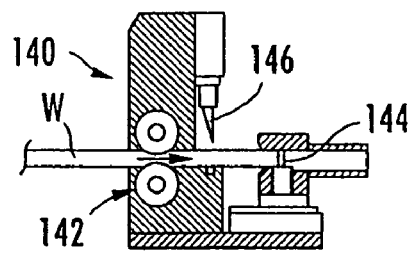
Figure 14F:
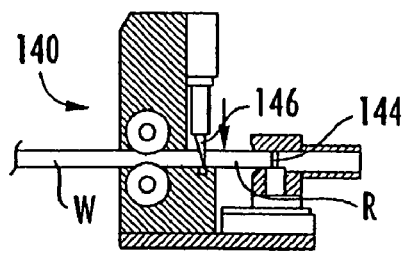

In accordance with another aspect of the, and with reference to FIGS. 14A through 14I, a machine module positioned by reference to the index member can include a hydraulic rivet machine 130 that uses the application of steady hydraulic pressure to press rivets into holes in the workpiece and to upset the rivets, as opposed to conventional riveters that forcefully hammer rivets for upsetting them. The rivet machine 130 comprises a pressure foot 132 that engages the front side of the workpiece parts to be riveted together and a back-up clamp foot 134 that engages the back side of the parts. The pressure foot 132 and clamp foot 134 are positioned by the positioner of the machine (e.g., the machine 90 in FIG. 13) on opposite sides of the workpiece parts as shown in FIG. 1, and are operated by suitable hydraulic actuators (not shown) to clamp the parts therebetween as depicted in FIG. 14B. Position sensors (not shown) associated with the pressure foot and clamp foot are used to measure the stack-up thickness G of the clamped parts. A signal indicating the measured stack-up thickness G is sent to a rivet cutting device 140, depicted in FIG. 14C. The rivet cutting machine 140 is supplied with a continuous rivet wire W, which is fed by a feed mechanism 142 against a movable stop 144 that is positioned by a controller of the machine such that a predetermined length L of wire W extends from the stop 144 to a cutting location where a cutter 146 is positioned as shown in FIG. 14E. The length L bears a predetermined relationship with the measured stack-up thickness G, such that the length L is longer than the thickness G by an amount sufficient to provide the proper grip length of the rivet when the rivet wire is upset to form a rivet joining the workpiece parts together. The rivet cutting machine's controller can determine the length L from a stored table correlating stack-up thicknesses G with rivet lengths L, or it can calculate the length L based on a suitable algorithm. The cutter 146 is operated to cut the rivet wire to provide a wire of length L, as shown in FIG. 14F.

At the same time that the rivet cutting device 130 is performing the operations shown in FIGS. 14C, 14E, and 14F, the drilling device of the machine (e.g., the drill 102 in FIG. 13) is moved to position a drill bit 148 in alignment with the pressure and clamp feet 132, 134 and is operated to drill a hole through the workpiece parts as shown in FIG. 14D.

Figure 14G:
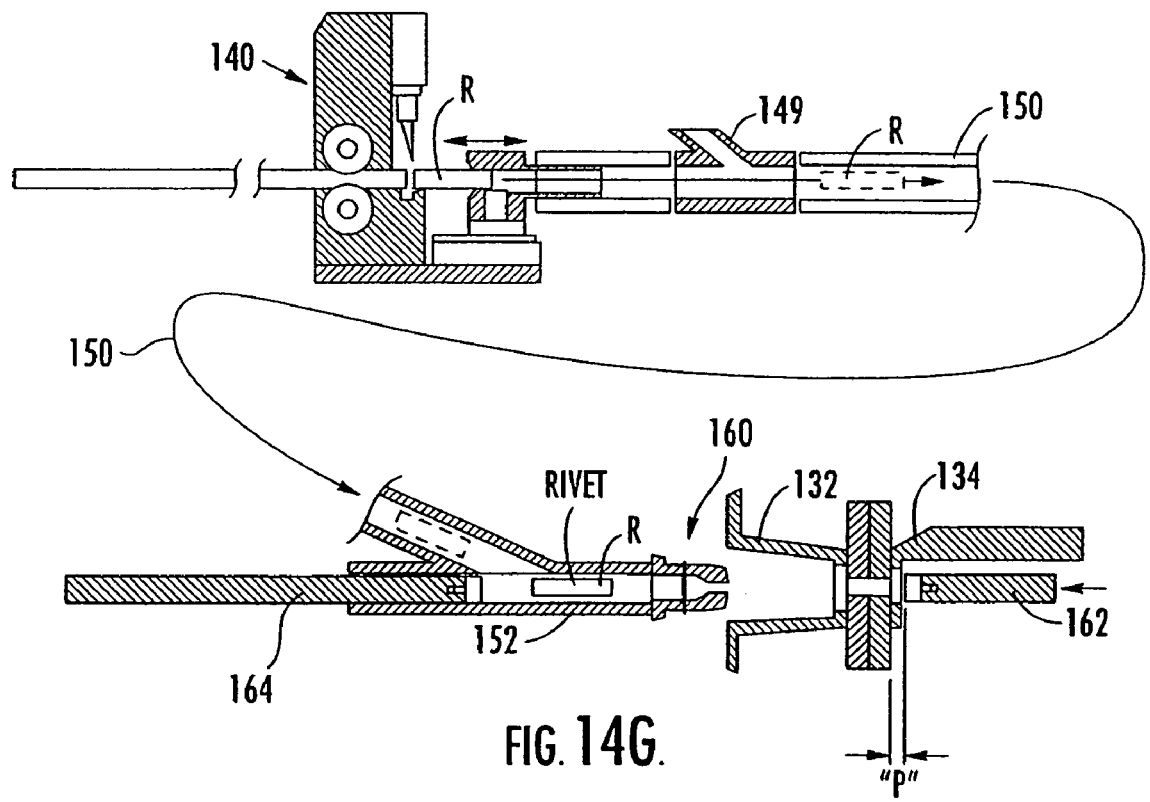
Figure 14H:
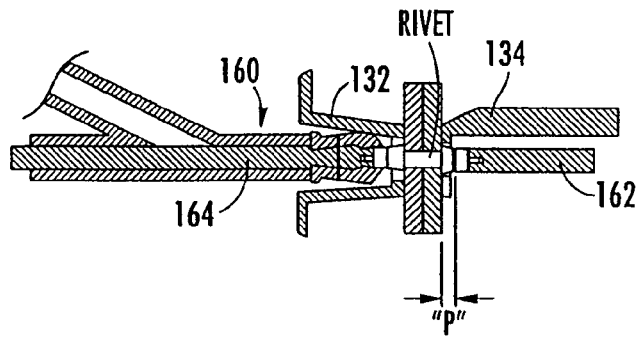
Figure 14I:
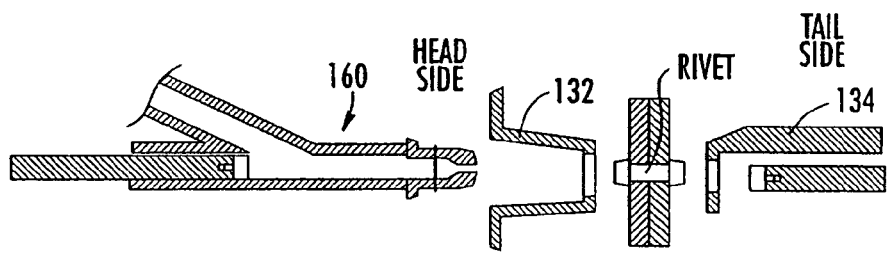

Once the rivet wire W is cut as in FIG. 14F, the movable stop 144 is retracted out of the way of the cut rivet R and the rivet is suctioned by vacuum, such as by an air-powered feed venturi 149, through a conduit or hose 150 as shown in FIG. 14G. The rivet R is fed into a nose piece 152 of a hydraulic ram 160 that is positioned in alignment with the hole in the workpiece parts. A hydraulic ram 162 on the back side (i.e., the tail side) of the workpiece parts is moved into position spaced a predetermined distance P from the back side of the workpiece parts, and a ram 164 of the front-side (i.e., head side) hydraulic ram 160 is operated to press the rivet R into the hole and against the tail-side ram 162 so as to upset the rivet, as shown in FIG. 14H. Both rams 162, 164 preferably have replaceable snap-on dies as shown. The pressure and clamp feet 132, 134 are then unclamped from the workpiece parts, and the rams 162, 164 are retracted to prepare for the next drilling and riveting operation as shown in FIG. 14I.

As an alternative to a hydraulic rivet press, other types of riveters such as pneumatic or electromagnetic riveters can be used. The advantageous rivet cutting and supply system in accordance with the invention can be adapted to the particular riveter used.

In one preferred embodiment of the invention, there are a plurality of rivet cutting machines 140 each supplied with a rivet wire W of a different diameter than the other machines. The proper rivet diameter for a given hole in a workpiece can be determined by the production system controller based on the process information stored in the data storage component of the system, and then the controller can select the corresponding rivet cutting machine to cut a rivet of the proper length and send it to the hydraulic ram 160. All of the rivet cutting machines are connected by their own flexible hoses to the hydraulic ram 160 so that any of them can send a rivet to the ram 160.

Preferably, the steps illustrated in FIGS. 14C, 14E, 14F, and 14G are performed before the drilling cycle of FIG. 14D is completed. Thus, parallel processing is employed in the rivet system of the invention.

Figure 15:
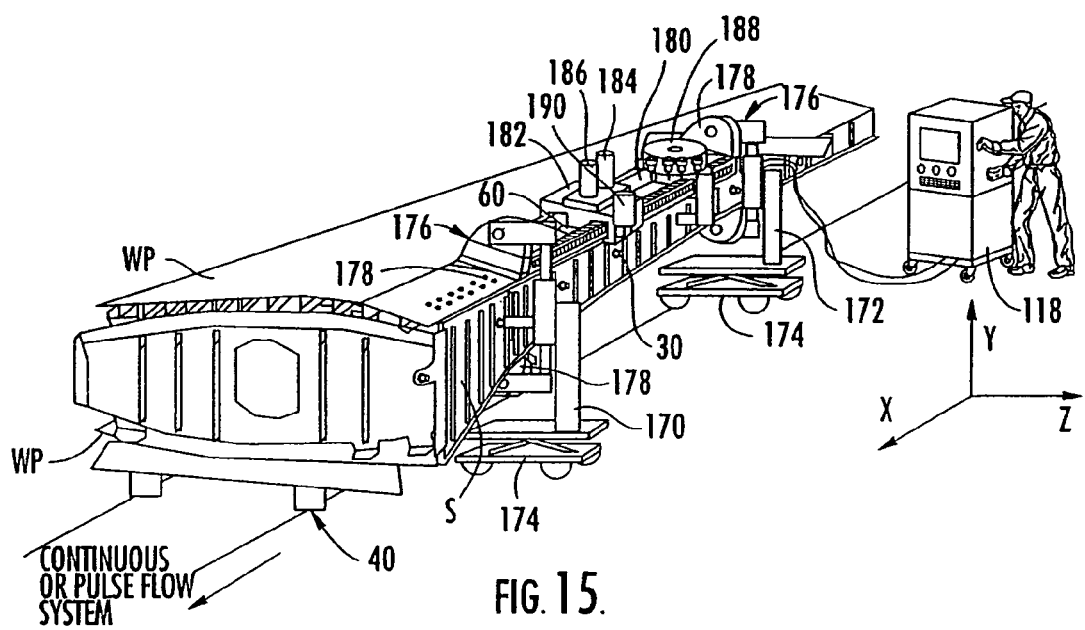
FIG. 15 shows a production system in accordance with another embodiment of the invention for clamping, drilling, and applying fasteners to a wing upper panel.

An alternative embodiment of a production system in accordance with the invention for clamping and fastening an upper wing panel to underlying spars is shown in FIG. 15. The production system of FIG. 15 is suitable for either a pulse-flow or continuous-flow process. To accommodate the continuous-flow process, the index support system is modified relative to those previously described. Thus, the index support system includes a pair of index supports 170, 172 that can travel along the floor on rolling or sliding zero-balance devices such as scissors tables 174 or the like. Alternatively, the index support system could be zero-balanced by an overhead balance system (not shown). The zero-balance devices allow the index member 60 supported by the support system to be maneuvered to engage a pair of index devices 30 mounted on the workpiece as previously described, and then the index support system clamps to the workpiece to fix its position. More particularly, the index support system includes a hydraulic clamp mechanism 176 mounted on each of the index supports 170, 172. Each clamp mechanism 176 includes opposed clamp-up pads 178 that engage lower and upper wing panels WP and clamp them against internal spars S of the wingbox structure. The index supports 170, 172 also support a track drilling machine including a track 180 along which a drill and fasten module 182 is traversable back and forth in the X direction. The drill and fasten module 182 includes a drill 184 and a bolt insertion device 186. The track drilling machine also includes an automated drill changer 188. The drill and fasten module 182 is driven back and forth in the X direction along the track 180 by a suitable drive arrangement 190 that drivingly engages the index member 60 as previously described for other embodiments.

The clamp mechanisms 176 provide sufficient clamp force (e.g., 800 to 1000 pounds) to prevent accumulation of cut chips from the drilling operation between the clamped parts of the wing assembly; accordingly, the process of disassembling and deburring to remove such chips can be eliminated. The drill and fasten module 182 can shuttle back and forth to drill holes and insert bolts at a plurality of locations while the clamping mechanisms 176 maintain the high clamping force.

Figure 16:
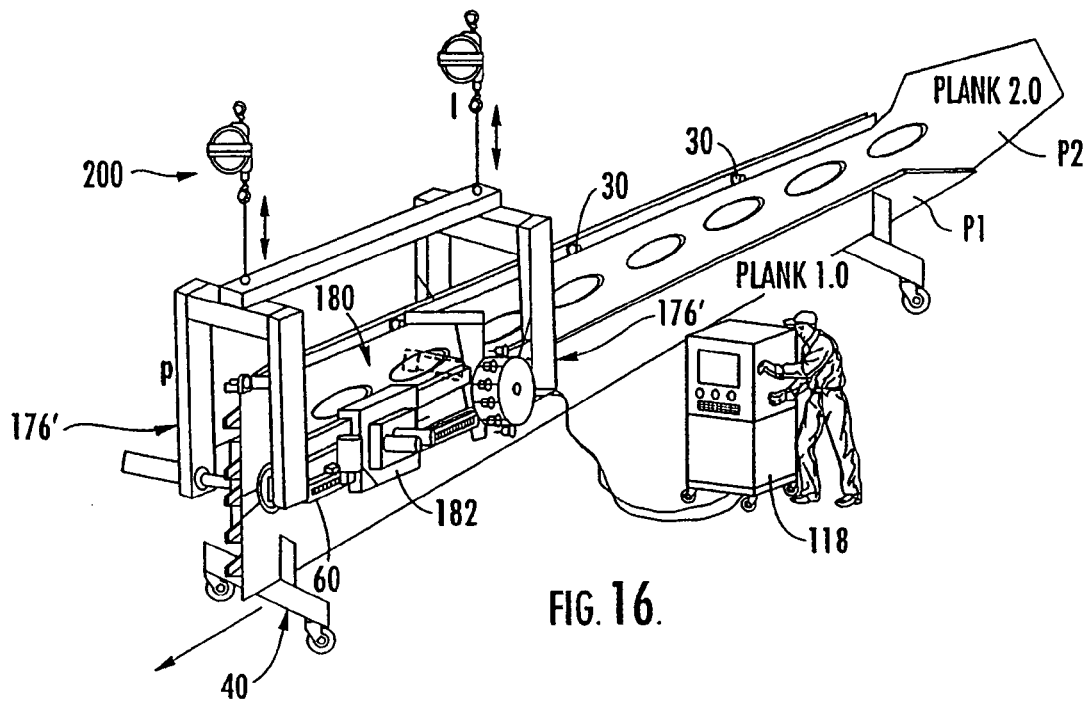
FIG. 16 shows a production system in accordance with a further embodiment of the invention for clamping, drilling, and inserting bolts for splicing together two planks.

FIG. 16 shows yet another embodiment of a production system in accordance with the invention for splicing together two planks P1, P2. The system is similar to that of FIG. 15, except that the index support system comprises an overhead zero-balance system employing a pair of clamp mechanisms 176' that are suspended from an overhead zero-balance arrangement 200 allowing the track drilling machine 180 to be maneuvered to engage a pair of the index devices 30 mounted on the workpiece. The clamp mechanisms 176' then clamp together the planks P1, P2 to be spliced by bolts, and the drill and fasten module 182 shuttles back and forth along the index member 60 drilling holes and inserting bolts generally as previously described for FIG. 15.

Figure 17:
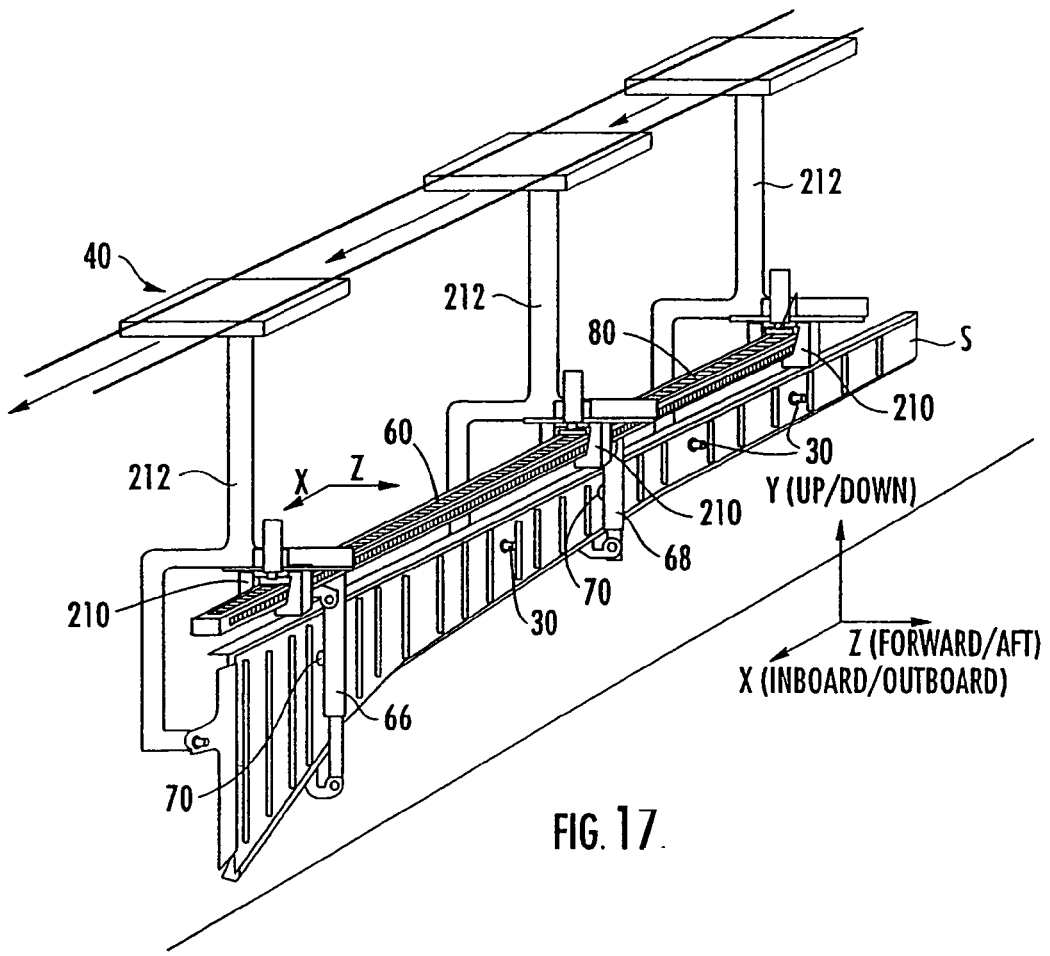
FIG. 17 shows a continuous-flow manufacturing production system in accordance with the invention with a spar supported therein.

FIG. 17 illustrates another variation in accordance with the invention. A material handling system 40 for a continuous-flow process transports a spar S along a process flow path (i.e., in the X direction). A plurality of clamp devices 210 for clamping onto the index member 60 are mounted on the workpiece-engaging members 212 of the material handling system. Thus, the index support system comprised by the clamp devices 210 travels along with the material handling system. The clamp devices 210 are slidable on the workpiece-engaging members 212 in the Y direction to allow the index member 60 to be moved back and forth in the Y direction. The index member 60 is also movable back and forth in the X direction when the clamp devices 210 are unclamped. Thus, the index member 60 can be maneuvered to engage the index arms 66, 68 of the index member with a pair of index devices 30 mounted on the spar. The clamping devices 70 of the index arms 66, 68 then clamp onto the index devices 30 and the clamp devices 210 of the index support system clamp onto the index member 60, thus immobilizing the index member relative to the workpiece. Once the index member is so immobilized, a machine module can be engaged with the index member and driven back and forth along it for positioning drills, fastener insertion devices, or other devices relative to the workpiece. The forces generated by the movement of the machine module along the index member are reacted through the material handling system 40 rather than through the floor as in previously described embodiments. In this system, the same index member 60 can ride along with the spar S but can be positioned at different locations along the spar by unclamping the clamp devices 70, 210 and repositioning the index member in engagement with a different pair of index devices 30, and then re-activating the clamp devices 70, 210.

Figure 18:
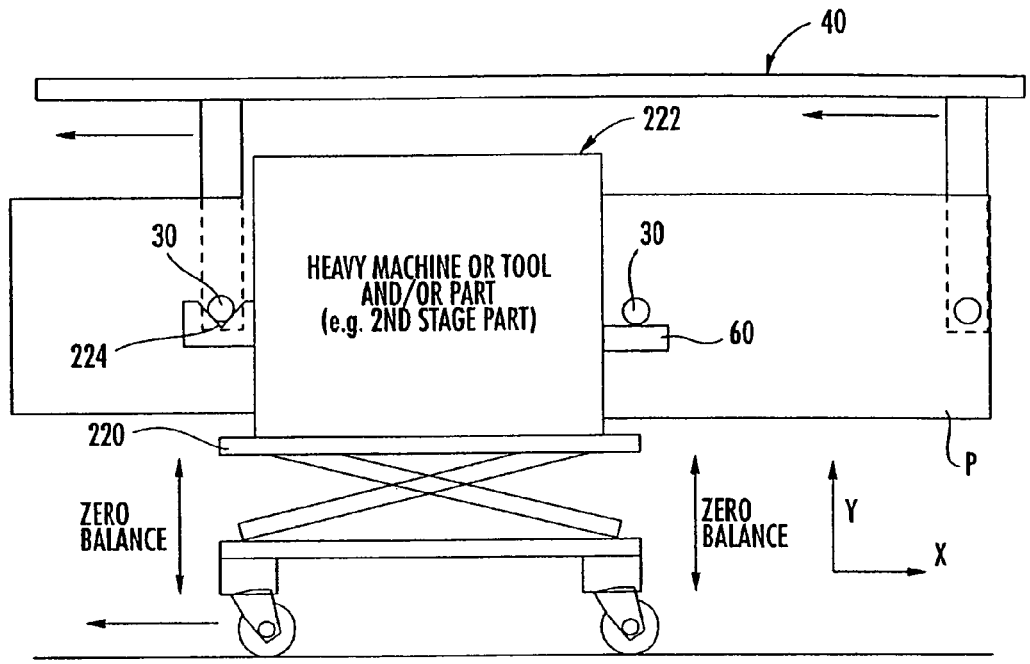
FIG. 18 is a schematic side elevation of a production system having a floating index support system in accordance with still another embodiment of the invention.

FIG. 18 illustrates a further variation in accordance with the invention. A plank P is supported by a material handling system 40 that transports the plank P along a process flow path in the X direction. An index support system is provided in the form of a rolling zero-balance cart 220, such as a scissors cart or spring-loaded cart, that rolls along a floor. The cart 220 supports an index member 60 and also supports a heavy machine, tool, and/or part, designated generally as reference number 222. The index member 60 engages and clamps onto a pair of index devices 30 mounted on the plank P. In the illustrated embodiment, the mechanism for engaging the index devices comprises a precision V-groove 224 formed in the index member 60 for engaging one index device 30 so as to fix the position of the index member 60 in the X direction, and a flat on the index member 60 that engages the other index device 30 to fix the Y location of the index member at that point. Thus, together the V-groove and flat fix the position and orientation (i.e., clocking) of the index member relative to the workpiece. The cart 220 allows the item 222 to be lifted up or down by a sufficient amount to maneuver the index member 60 for engaging the index devices 30; the item 222 can be lifted with substantially less force than the actual weight of the item. For example, a Bishamon scissors cart allows an 800-pound load to be lifted up or lowered several inches with as little as 20 pounds of force. Once the index member 60 is thus indexed to the plank P, the machine or other item 222 is firmly clamped to the plank P. As the plank is carried along the process flow path by the material handling system 40, the cart supporting the item 222 is carried along with the plank, and the cart "floats" along the floor. Preferably, the material handling system 40 is designed so that it pulls the cart 220 directly rather than using the plank P to pull the cart. For example, the index device 30 engaged in the V-groove 224 can be coupled directly to the material handling system 40, such that loads in the X and Y direction are reacted from the material handling system 40 through the index device 30 to the index member 60.

Figure 19:
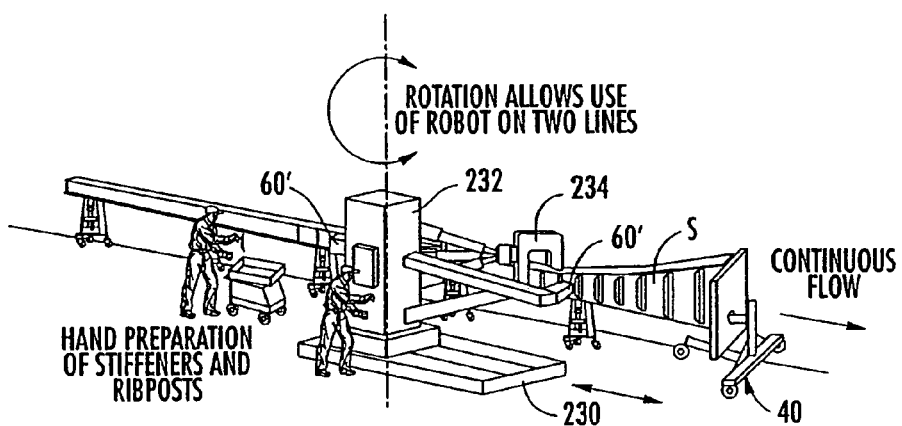
FIG. 19 shows a continuous-flow production system having a base that shuttles back and forth along the process flow path and supports a machine and index system that engage the workpiece.

FIG. 19 depicts another production system in accordance with the invention. The system employs a continuous-flow process with a material handling system 40 supporting a spar S and transporting it along a process flow path. Alongside the process flow path a sliding base 230 is disposed on a floor. A machine or robot 232 is supported on the base 230 and preferably is movably supported on the base 230 so that the machine can translate and/or rotate about one or more axes for positioning a working end effector 234 of the machine. The machine includes index members 60' that engage index devices (not visible in FIG. 19, but similar to the index devices 30 shown in previously described embodiments) mounted on the spar S. Once engagement between the index devices and index member 60' is achieved, the base 230 travels along with the spar, driven by a suitable drive arrangement (not shown), so that the machine 232 can perform work operations on the spar. When the base 230 reaches the end of its range of travel in the process flow direction, a proximity switch (not shown) or the like triggers the index members 60' to disengage the index devices on the workpiece and the machine to disengage the spar, and triggers the base drive arrangement to shuttle the base 230 back to its starting position so that the machine can re-engage the spar to start work on a new zone of the spar.

Figure 20:
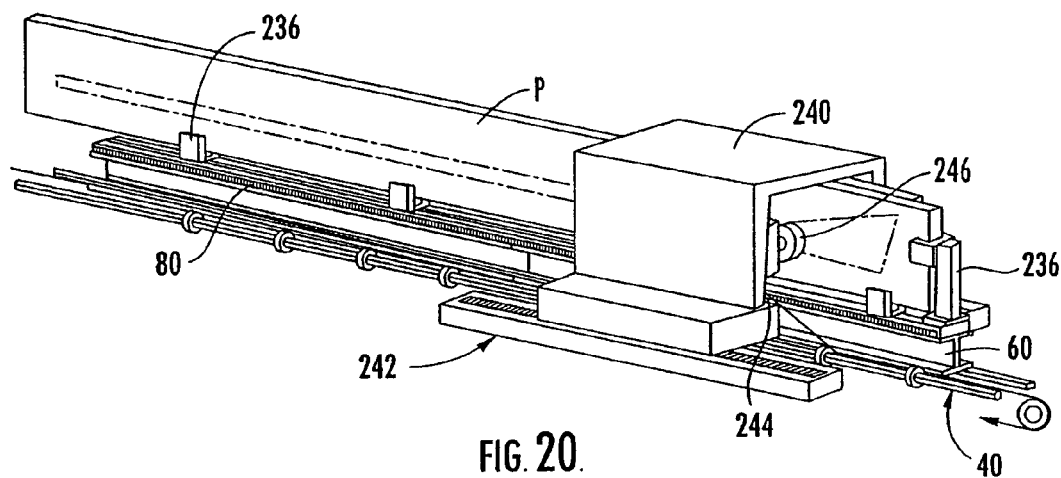
FIG. 20 shows another production system having a machine that shuttles back and forth on a fixed base and wherein an index member with an encoder strip is fixed to and travels with the workpiece and the machine clamps onto the index member to be carried along with the workpiece.

FIG. 20 depicts a further embodiment similar in some respects to that of FIG. 19. A blank B for a spar web is supported on an index member 60 in the form of an I-beam that in turn is supported on a material handling system 40. The location of the blank B relative to the index member 60 is known, such as by using suitable fixtures 236 mounted on the index member 60 for engaging the blank to fix its location in the X, Y, and Z directions. The index member 60 has an encoder strip 80 mounted along its length. A milling machine 240 is mounted on a sliding rail system 242 that runs parallel to the process flow direction along which the blank B is transported. A reader 244 on the machine 240 reads the encoder strip 80 as the blank and index member move along the process flow path. When the blank becomes positioned in a predetermined X location relative to the machine 240, the machine clamps onto the index member 60 and is then carried along with the blank. The machine has a milling head 246 that preferably is movable relative to the blank in the X, Y, and Z directions so that the machine can mill a zone of the blank. When the machine 240 reaches the end of its range of travel in the X direction, a proximity switch (not shown) or the like triggers the machine to disengage the blank and unclamp from the index member 60, and the machine is shuttled back to its starting location to re-engage the blank for milling a new zone of the blank.

Figure 21:
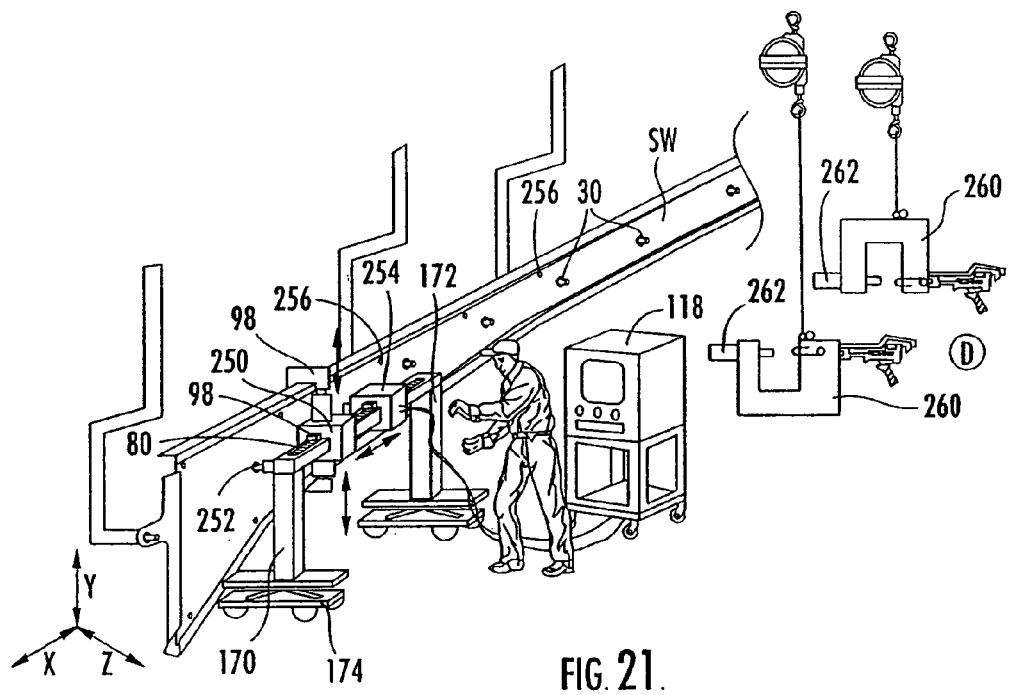
FIG. 21 shows a production system for automated placement and clamping of chords onto a spar and employing C-frame clamping and fastening mechanisms for fastening the chords to the spar web.

FIG. 21 depicts a still further embodiment of the invention for automated location of chords on a spar web SW. The system is similar in some respects to that of FIG. 15, in that the index support system employs supports 170, 172 that are supported on a zero-balance table or cart 174 such as a scissors cart or spring-loaded cart that travels along the floor. A chord locating tool 250 engages the index member 60 for movement therealong and includes a reader 98 for reading the encoder strip 80 on the index member. The index member 60 includes a fixed index 252 that is fixed relative to the index member 60 and engages a first one of two index devices 30 mounted on the spar web. A free index 254 that is traversable along the index member 60 engages the second index device 30, and includes a reader 98 for reading the encoder strip 80. Each index 252, 254 includes a reader (not shown) for reading the identifier stored in the sensor of each index device 30 so that the controller 118 can identify the zone of the spar web at which the chord locating tool 250 is disposed. The controller 118 can then retrieve information regarding the chord locations for that zone of the spar web. Once this data is retrieved, the sealed chords can be positioned with respect to the spar web. The chord locating tool 250 shuttles back and forth along the index member 60 and is positioned with reference to the encoder strip 80 so as to locate each chord in the proper location along the spar web.

Once a chord is positioned, a simple method is then used for installing permanent tack fasteners to fasten the chord to the spar web. In accordance with this method, pre-drilled pilot holes 256 are drilled in the spar web to mark the tack locations. The pilot holes 256 can be drilled in the spar web during web fabrication, or can be drilled with portable drilling equipment such as that described below in connection with FIG. 23. Then, small C-frames 260 providing a substantial amount of clamping force (e.g., about 1000 pounds) via hydraulic actuators 262 are used to clamp the located chords to the spar web, and drilling devices 264 mounted on the C-frames 260 are used to drill the holes for bolts that fasten the chords to the web, using the pilot holes as guides. The drilling devices 264 can be, for example, flexible and removable powerfeed motors used with step drills. The motor can be removable by any suitable arrangement, such as a concentric collet system, so that the holes can be reamed, the holes can cold worked if needed, and then bolts can be installed in the holes, all while the clamp-up of the chord to the web is maintained by the C-frame.

Figure 22:
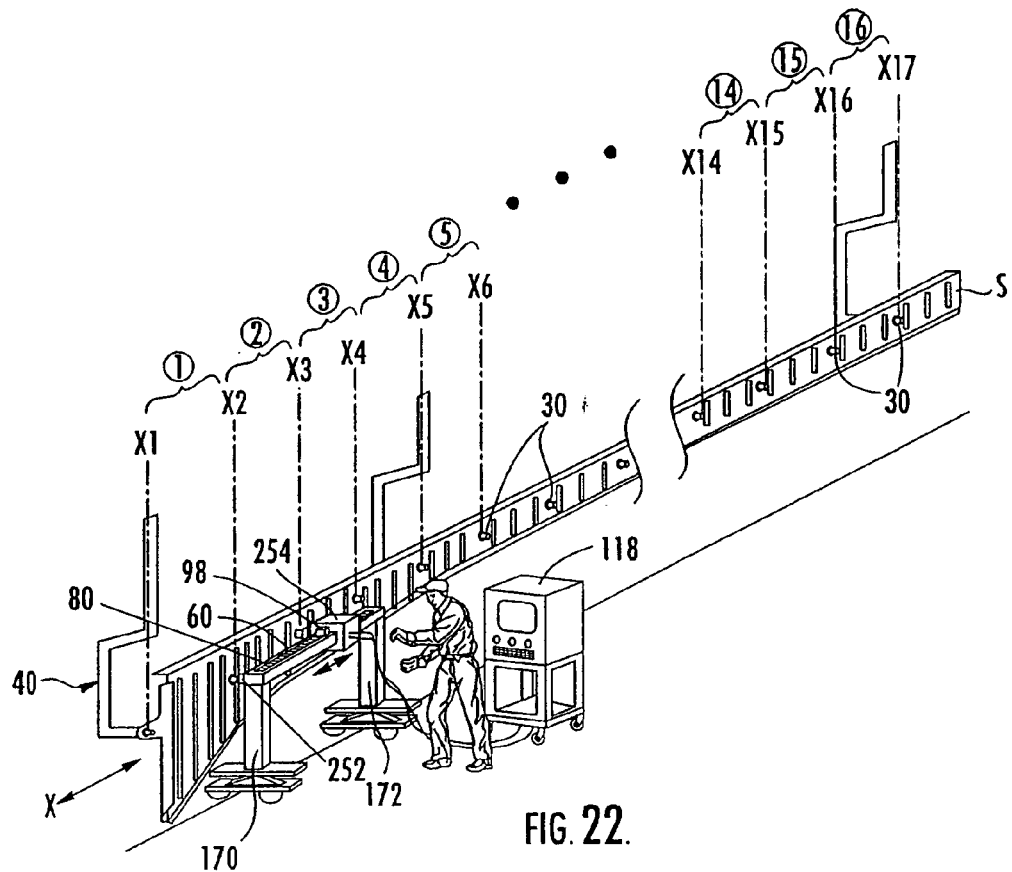
FIG. 22 illustrates a production system and method for measuring and recording growth of a workpiece.

FIG. 22 illustrates a process and system in accordance with the invention for monitoring and recording growth of a workpiece during manufacturing. For various reasons, an elongate workpiece such as a spar or plank used in aircraft structures can become longer during manufacturing. Because of the substantial length of some of these workpieces, the overall growth of the workpiece can be quite substantial, which obviously affects the placement of holes and other items such as stiffeners, chords, or the like. In accordance with the present invention, the growth is monitored and taken into account during the manufacturing process. To this end, the production system employs a plurality of index devices 30 mounted on the workpiece S at locations that are spaced apart along the X direction. The index devices 30 are installed prior to the workpiece being worked upon in any manner that would result in any significant elongation of the workpiece; accordingly, the nominal X locations of the index devices are known. By "nominal X locations" is meant the X locations of the index devices before the workpiece is subjected to any growth-causing work processes. The actual X locations of the index devices 30 are denoted X1, X2, . . . , X17 in FIG. 22. Because of growth of the workpiece, the actual X locations will be different from the nominal X locations.

The actual X locations are determined through the use of the indexing system generally similar to that previously described. More particularly, an adjacent pair of index devices 30 are engaged by a pair of indexes 252, 254 mounted on the index member 60. The index 252 preferably is a fixed index mounted in a fixed position on the index member, and includes a reader (reference number 50 in FIGS. 3A and 3B) for reading the identifier stored in the sensor of the index member 30 engaged by the index 252. The index 254 is a free index that can traverse back and forth along the index member 60 and includes a reader 98 for reading the encoder strip 80 on the index member such that the controller 118 in communication with the reader 98 can determine the precise location of the free index 254 in the X direction. Accordingly, when the fixed index 252 engages the index device 30 at location X1 and the free index 254 engages the index device 30 at location X2, the controller can determine the actual difference in X position between these two index devices and subtract from that difference the nominal difference in X position between the index devices. The resulting number is the growth of the workpiece between the positions X1 and X2, which is denoted X2" herein. The process is repeated between the locations X2 and X3, between X3 and X4, between X4 and X5, and so on, up to the locations X16 and X17. From this procedure, a series of growth values X2", X3", . . . , X17" are derived between each adjacent pair of index devices. The actual X locations of the index devices 30 are calculated as follows:

$X2 = X2_{nominal} + X2''$ $X3 = X3_{nominal} + X2'' + X3''$ $X4 = X4_{nominal} + X2'' + X3'' + X4''$

.
.
.

$X17 = X17_{nominal} + X2'' + X3'' + \ldots X17''$

Preferably, temperature compensation should be included in the algorithm for measuring spar growth to account for thermal elongation effects. Methods for accounting for thermal elongation are known in the art, and hence are not described herein.

Alternative methods for measuring spar growth using the index system of the present invention can be used. For example, the fixed and free indexes 252, 254 can engage non-adjacent index devices 30 to measure the growth between these index devices, and the growth for any intermediate index device(s) between the non-adjacent index devices can be determined by interpolation. This method is not as accurate as that described above, but could have an advantage in providing a greater space between the free and fixed indexes such that a machine module (e.g., an O-frame machine 90 such as in FIG. 7) can engage the index member 60 between these indexes and perform work operations on the workpiece while the growth is simultaneously monitored.

Figure 23:
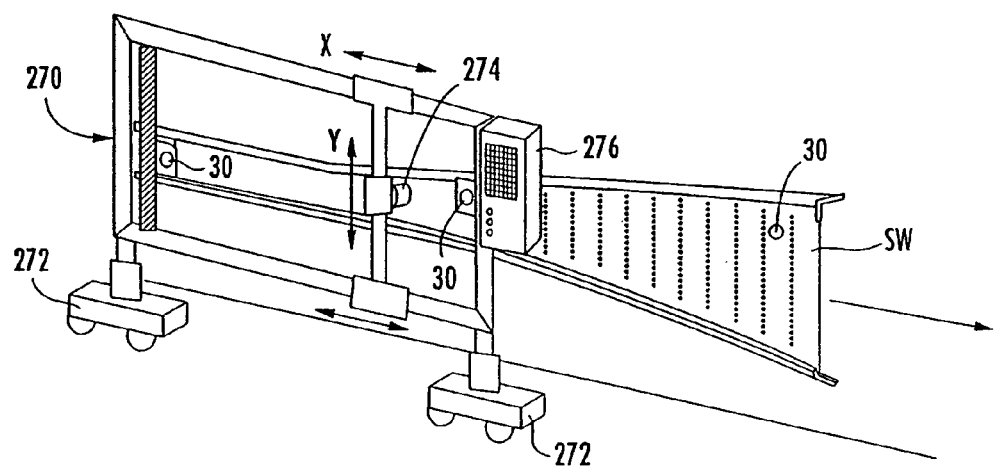
FIG. 23 illustrates a production system for drilling holes in a workpiece in accordance with another embodiment of the invention.

FIG. 23 shows yet another embodiment of the invention for drilling holes, such as determinate assembly (DA) holes, in a workpiece. A plurality of index devices 30 are mounted on the workpiece SW at known locations thereof. An index support system in the form of a 2-axis positioner frame 270 is supported on the floor by vertically floating or resiliently suspended bases 272 that roll or slide along the floor in the X direction. Alternatively, of course, the index support system could be suspended from overhead by a suitable vertically floating mechanism. The frame 270 engages a pair of the index devices 30 on the workpiece in any of the manners previously described for other embodiments, thereby fixing the position and orientation of the frame 270 relative to the workpiece. A drill head 274 is mounted in the frame for movement along each of two axes generally parallel to the X and Y directions as shown. A controller 276 is connected to readers (not shown, but see reader 50 in FIGS. 3A and 3B) incorporated in the portions of the frame that engage the index devices 30 for reading the identifiers from the index devices. The controller 276 retrieves the appropriate set of work process information (e.g., a numerical control program or the like) pertaining to the workpiece zone corresponding to the identifiers, and controls the positioning and operation of the drill head 276 so as to drill holes as prescribed by this process information.

Figure 24:
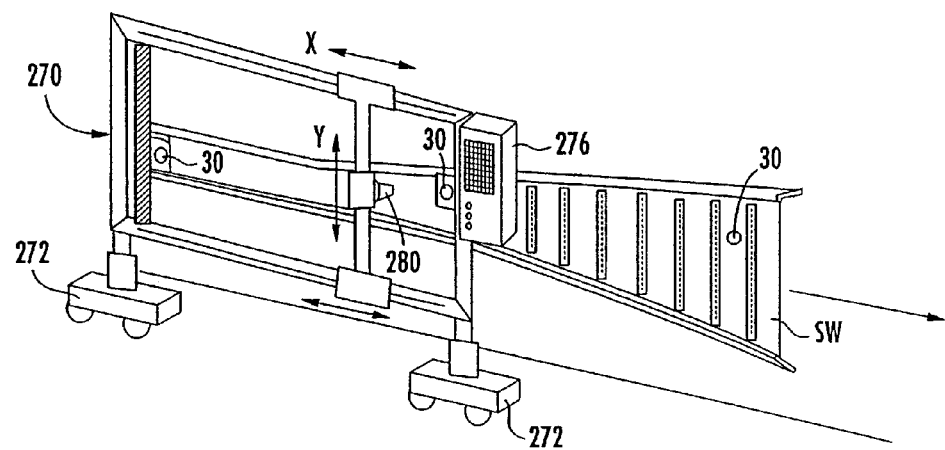
FIG. 24 depicts a production system for applying accurate markings to a workpiece.

FIG. 24 shows another embodiment of the invention substantially similar to that of FIG. 23, except that instead of supporting a drill head the frame 270 supports a marking device 280 operable to apply markings on the workpiece in accordance with process information retrieved by the controller 276. The marking device can comprise, for example, an ink jet head or an ink pen device. Using the marking device, accurate ink marks can be applied to the workpiece for various purposes, including but not limited to vision system location and maneuvering of automated equipment, use of the markings by workers in performing operations, use of the markings for quality inspection purposes, and others.

Figure 25:
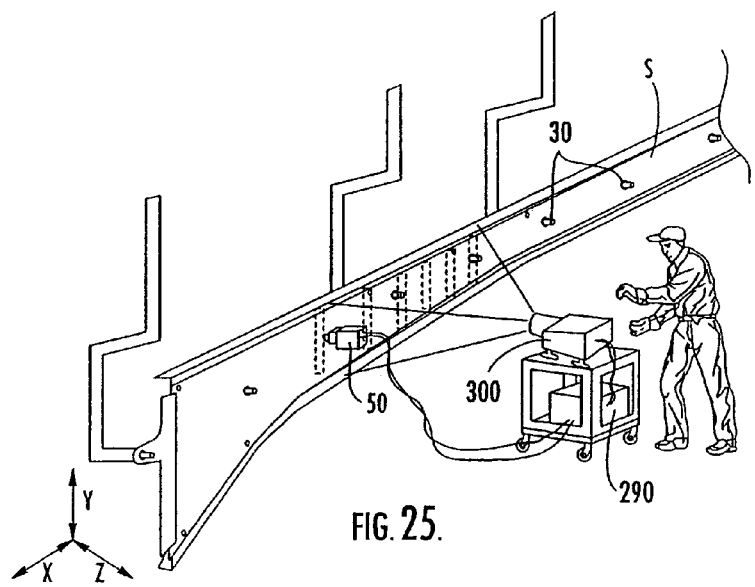
FIG. 25 shows a system for projecting information onto a workpiece in accordance with the invention.
Figure 26:
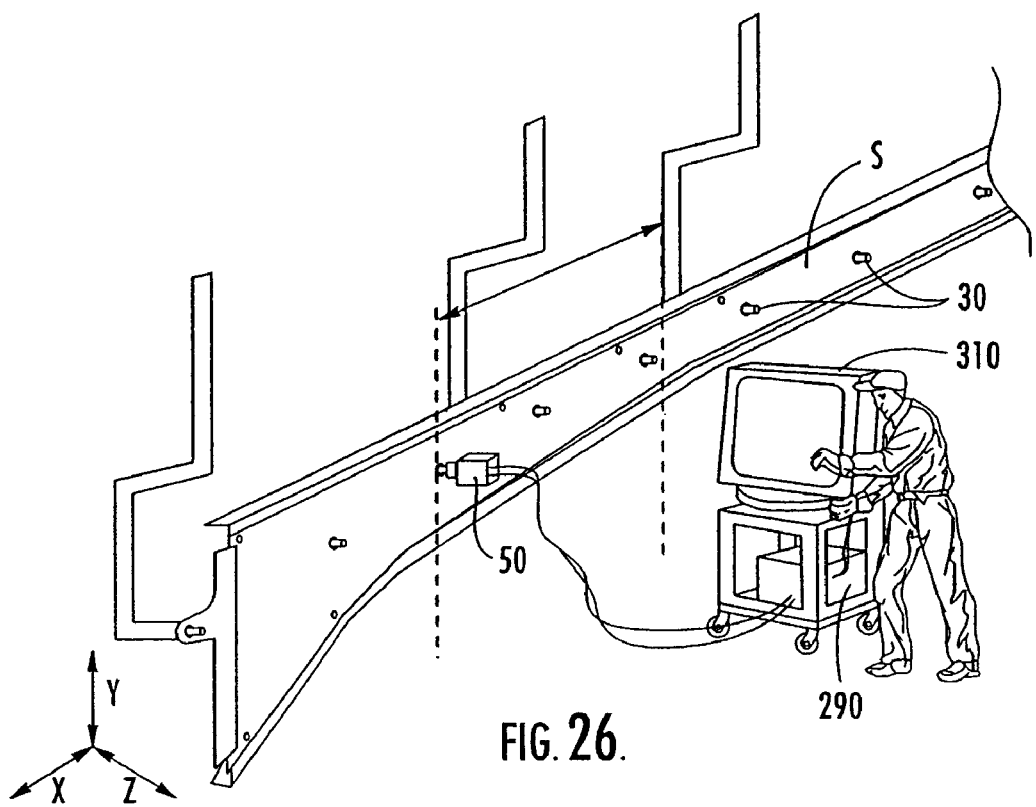
FIG. 26 shows a system for displaying information about a workpiece in accordance with the invention.

FIG. 25 shows a system in accordance with the invention for projecting information onto a workpiece. One problem with a manufacturing system that is not a fixed-base system is providing manufacturing blueprints and other information to workers at the work location, which can vary as the workpiece travels down the manufacturing line. The invention addresses this problem by providing a reader 50 that engages an index device 30 and reads the identifier as described for FIGS. 3A and 3B, and a controller or other computer 290 linked to the reader 50 and to a projector 300. Based on the identifier read by the reader, the computer 290 can retrieve manufacturing information about the zone of the workpiece adjacent to the index device 30 and can cause the projector 300 to project such information in visual form onto the workpiece S. It is possible to position the projector 300 such that graphical depictions of features projected by the projector line up to scale with known features on the workpiece. FIG. 26 shows a variation of the system of FIG. 25, in which a monitor 310 such as a CRT display or the like is used for displaying the manufacturing information. Other types of display devices can also be used, and more than one type can be used in conjunction.

Many modifications and other embodiments of the invention will come to mind to one skilled in the art to which this invention pertains having the benefit of the teachings presented in the foregoing descriptions and the associated drawings. For example, while the illustrated and described embodiments of the invention employ a machine-readable tape or strip on the index member for enabling the machine module to determine its position relative to the workpiece, alternatively other positioning systems could be used for this purpose. Examples of such positioning systems include but are not limited to laser positioners. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An index device for mounting on a workpiece to be used as a reference feature in manufacturing operations, comprising:
   a housing structured and arranged to attach to the workpiece and engage a hole formed in the workpiece so as to locate the index device relative to the workpiece, said housing configured to be carried by the workpiece during the manufacturing operations, wherein the housing has a first portion and a second portion that are each larger than the hole in the workpiece so as to engage opposite sides of the workpiece, are positioned on opposite sides of the workpiece and are connected together by a shaft passing through the hole in the workpiece; and
   a machine-readable microchip carried by the housing, the microchip programmed to store a unique identifier, whereby the identifier is configured to be correlated with the location of the index device on the workpiece, wherein the microchip is located in one of the first and second portions, and the other of the portions has a second microchip therein for storing a unique identifier.

2. The index device of claim 1, wherein the housing has a generally pin-shaped configuration.

3. The index device of claim 1 wherein each microchip is carried by the housing so as to be physically contacted by a reader.

4. The index device of claim 1, wherein each of the first and second portions defines at least one datum surface providing a position reference.

5. The index device of claim 1 wherein the housing comprises visual indicia configured to identify the index device.

6. The index device of claim 1, wherein the housing defines at least X and Y datum surfaces providing X and Y position references.

7. The index device of claim 6, wherein the housing further defines a Z datum surface providing a Z position reference.

8. The index device of claim 1 wherein the first and second portions of the housing are configured to mechanically engage one another.

9. The index device of claim 8 wherein one of the first and second portions comprises the shaft configured to extend through the hole in the workpiece and engage the other one of the first and second portions.

10. An index device for mounting on a workpiece to be used as a reference feature in manufacturing operations, comprising:
    a housing structured and arranged to attach to the workpiece and engage a hole formed in the workpiece so as to locate the index device relative to the workpiece, wherein the housing has a first portion and a second portion that are each larger than the hole in the workpiece so as to engage opposite sides of the workpiece and are mechanically connected together by a shaft passing through the hole in the workpiece; and
    a machine-readable microchip carried by the housing, the microchip programmed to store a unique identifier, wherein the identifier is configured to be correlated with the location of the index device on the workpiece, wherein the microchip is located in one of the first and second portions, and the other of the portions has a second microchip therein for storing a unique identifier.

11. The index device of claim 10, wherein each of the first and second portions defines at least one datum surface providing a position reference.

12. The index device of claim 10, wherein the housing defines at least X and Y datum surfaces providing X and Y position references.

13. The index device of claim 12, wherein the housing further defines a Z datum surface providing a Z position reference.

14. The index device of claim 10 wherein each microchip is carried by the housing so as to be physically contacted by a reader.

15. The index device of claim 10 wherein the housing comprises visual indicia configured to identify the index device.

* * * * *

UNITED STATES PATENT AND TRADEMARK OFFICE
CERTIFICATE OF CORRECTION

PATENT NO. : 7,574,933 B2 Page 1 of 1
APPLICATION NO. : 11/227941
DATED : August 18, 2009
INVENTOR(S) : Hazlehurst et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this

Seventh Day of September, 2010

David J. Kappos
*Director of the United States Patent and Trademark Office*